United States Patent Office 3,419,593
Patented Dec. 31, 1968

3,419,593
CATALYSTS FOR THE REACTION OF ≡SiH WITH ORGANIC COMPOUNDS CONTAINING ALIPHATIC UNSATURATION
David N. Willing, Midland, Mich., assignor to Dow Corning Corporation, Midland, Mich., a corporation of Michigan
No Drawing. Filed May 17, 1965, Ser. No. 456,516
7 Claims. (Cl. 260—448.2)

ABSTRACT OF THE DISCLOSURE

A catalyst useful for the reaction between silicon bonded hydrogen atoms and aliphatically unsaturated bonds is the reaction product of chloroplatinic acid and an organosilicon compound having the formula

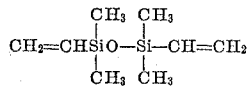

where R is a monovalent hydrocarbon or halohydrocarbon radical and at least one R contains terminal aliphatic unsaturation, X is a hydrolyzable group, $n$ is 1.5 to 3, $m$ is 1 to 20 and $a$ is 0 to 2.5. An example of the organosilicon compound is

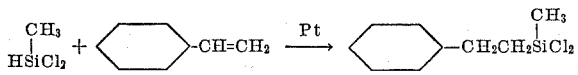

---

This application relates to new catalysts for the well-known generic reaction:

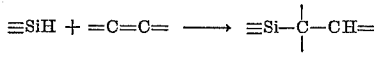

Virtually any compound which contains a ≡SiH group can be reacted with practically any compound containing aliphatic unsaturation in the presence of a platinum compound such as chloroplatinic acid. The reaction is thoroughly discussed in U.S. Patent 2,823,218, issued to Speier and Hook, which patent is incorporated by reference into this disclosure. An example of the above reaction is:

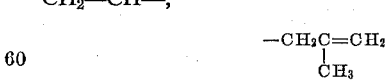

This application relates to the use, as a catalyst for the above general reaction, of a composition consisting essentially of the reaction product of (1) Chloroplatinic acid, and
(2) At least one organosilicon compound of the formula

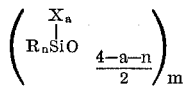

where
R is selected from the group consisting of monovalent hydrocarbon and monovalent halohydrocarbon radicals, at least one of said R groups containing terminal aliphatic unsaturation,
X is a hydrolyzable group,
$n$ has an average value of 1.5 to 4,
$m$ has an average value of 1 to 20, and
$a$ has an average value of 0 to 2.5.

The catalysts of this invention exhibit superior compatibility with organosilicon compounds; therefore less platinum is required to perform the above reaction when the catalyst of this invention is used than when catalysts such as chloroplatinic acid or platinized carbon are used. Correspondingly, faster reactions can be obtained with the catalyst of this invention than with equal amounts of platinum in the form of chloroplatinic acid. Furthermore, catalysts such as chloroplatinic acid tend to thicken the reaction medium due to their geenral incompatibility with organic compounds. This potentially undesirable side effect can be eliminated through the use of the catalysts of this invention. These catalysts have the further advantage of being generally fluid and of low viscosity.

R can be any monovalent hydrocarbon radical, e.g., alkyl and cycloalkyl radicals such as methyl, ethyl, isopropyl, cyclohexyl, 2-ethylhexyl, and octadecyl; aliphatically unsaturated radicals such as vinyl, ethynyl, allyl, cyclopentenyl, and 4-octenyl; and aryl-containing radicals such as phenyl, tolyl, benzyl, xenyl, 2-phenylpropyl, and naphthyl.

R can also be any monovalent halohydrocarbon radical, e.g., haloalkyl radicals such as 3,3,3-trifluoropropyl, dichloropropyl, bromocyclohexyl, and 8-bromooctyl; aliphatically unsaturated halohydrocarbons such as 3-chloroallyl, difluorocyclohexenyl, and 5,6-dibromooctenyl-7; and aryl-containing halohydrocarbons such as dichlorophenyl, bromoxenyl, fluorotolyl, or p-bromobenzyl.

X can be any silicon-bonded group that reacts with water at less than 100° C., leaving silanol groups behind, e.g., alkoxy groups such as methoxy, ethoxy, isobutoxy, and hexoxy; acyloxy groups such as acetoxy and butyroxy; halogen groups such as chlorine and bromine, and ketoxime derivatives such as

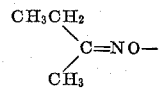

and $(C_6H_{13})_2CNO—$.

The catalysts of this invention can be made simply by heating a mixture of ingredients (1) and (2) at a temperature of about 20° to 150° C.

The exact nature of the reaction that occurs is uncertain. It is believed that the chloroplatinic acid forms a complex with the aliphatically unsaturated R groups of the organosilicon compound. It is desirable to provide at least one R group with terminal aliphatic unsaturation for every atom of platinum present, and a two-fold or more molar excess of terminal, aliphatic unsaturation is highly desirable, since the platinum catalyst is operative in very low concentrations. Such a molar excess assures that all of the platinum present is complexed with ingredient (2), avoiding any waste of platinum.

By "terminal aliphatic unsaturation," it is meant that one of the carbon atoms participating in the unsaturated linkage is bonded to only one carbon atom, e.g.: $CH_2=CH—$,

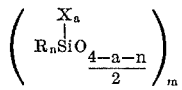

or $CH≡C—$. It is preferred for the required unsaturated R groups to be vinyl, an average of at least two vinyl groups being present per molecule of ingredient (1).

Ingredient (2) can be a homopolymer such as

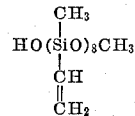

or

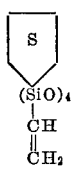

or it can be a copolymer such as

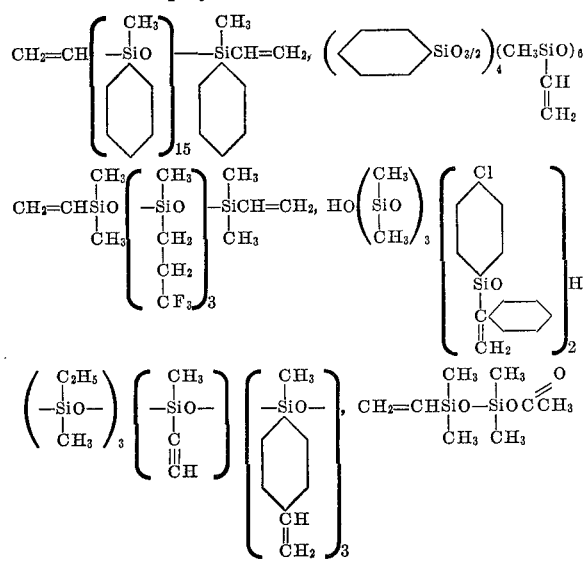

or

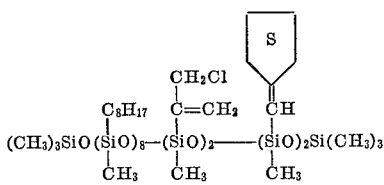

Ingredient (2) can also be a silane, e.g.:

$(CH_2=CH)_2Si(OC_6H_{13})_2$  $CH_2=CHSi(CH_3)_3$

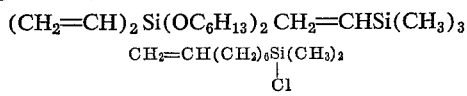

or a mixture of

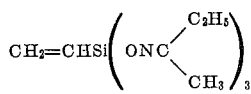

and

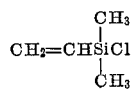

but it is preferably a polysiloxane.

Ingredient (2) can contain small numbers of extraneous groups such as the silicon-bonded hydrogen or hydroxyl groups.

The choice of the most desirable ingredient (2) depends upon the nature of the reaction for which the catalyst complex is desired. The ingredient (2) which is selected should be compatible with one or more of the ingredients for the above-mentioned reaction.

A preferred embodiment of this invention comprises using, as a catalyst for the reaction between ≡SiH and aliphatically unsaturated bonds, a composition consisting essentially of the reaction product of chloroplatinic acid and

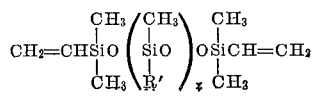

where R' is selected from the group consisting of monovalent hydrocarbon and monovalent halohydrocarbon radicals, and $x$ is an integer of 3 to 6.

The compatibility characteristics of this reaction product can be altered to meet various stuations by using different R' groups, e.g., methyl, octadecyl, phenyl, or 3,3,3-trifluoropropyl.

The above siloxanes can be made by equilibrating sym-divinyltetramethyldisiloxane with cyclic siloxane of the formula

in an alkaline medium, where R' and $x$ are defined above. Examples of the classes of R' are likewise shown above.

The catalyst of this invention exhibits a catalytic activity in the reaction of silicon hydride with olefins and olefin derivatives which is roughly proportional to the concentration of platinum present. A catalytic amount of platinum is all that is required for the reacton to proceed. It is generally preferred for sufficient catalyst to be present in the silicon hydride-aliphatic unsaturation reaction mixture to provide at least $1 \times 10^{-8}$ mole of platinum per equivalent of aliphatic unsaturation present.

The following examples are illustrative only and should not be construed as limiting the invention, which is properly delineated in the appended claims.

Example 1

A mixture of 150 gm. of distilled sym-divinyltetramethyldisiloxane and 3.2 g. of chloroplatinic acid ($H_2PtCl_6 \cdot 6H_2O$) was heated and stirred for 1 hour at 120° C.

The mixture was cooled and diluted with 260 g. of sym-divinyltetramethyldisiloxane.

After filtering, the product was a clear, acidic, light yellow liquid. The acidity was removable by washing with water.

When a trace of this neutral liquid was added to a mixture of

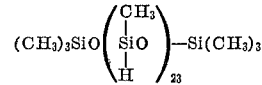

and

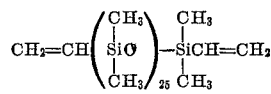

with gentle heating, a gel formed, indicating that the known reaction between the ≡SiH and $CH_2=CH-$ linkages had taken place.

Example 2

When 0.1 g. of chloroplatinic acid is heated at 100° C. with 20 g. of

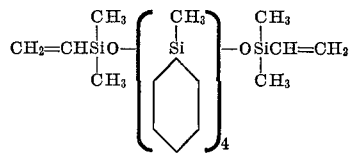

a homogeneous product is formed which is a strong catalyst for the reaction of ≡SiH bonds with aliphatically unsaturated bonds.

Example 3

When 0.1 g. of diallyldiethoxysilane is heated with 0.1 g. of chloroplatinic acid, a homogeneous product is formed which is a strong catalyst for the reaction of ≡SiH bonds with aliphatically unsaturated bonds.

That which is claimed is:

1. As a catalyst for the reaction between ≡SiH and aliphatically unsaturated bonds, a composition consisting essentially of the reaction product of
(1) chloroplatinic acid, and
(2) at least one organosilicon compound of the formula

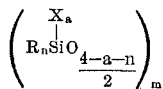

where
R is selected from the group consisting of monovalent hydrocarbon and monovalent halohydrocarbon radicals, at least one of said R groups containing terminal aliphatic unsaturation,
X is a hydrolyzable group,
$n$ has an average value of 1.5 to 3,
$m$ has an average value of 1 to 20, and
$a$ has an average value of 0 to 2.5.

2. The catalyst of claim 1 where an average of at least two R groups per molecule are vinyl.

3. As a catalyst for the reaction between $\equiv$SiH and $=$C$=$C$=$ bonds, a composition consisting essentially of the reaction product of chloroplatinic acid and symtetramethyldivinyldisiloxane.

4. As a catalyst for the reaction between $\equiv$SiH and aliphatically unsaturated bonds, a composition consisting essentially of the reaction product of chloroplatinic acid and

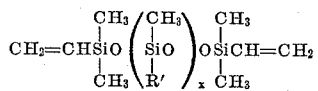

where
R' is selected from the group consisting of monovalent hydrocarbon and monovalent halohydrocarbon radicals, and
$x$ is an integer of 3 to 6.

5. The composition of claim 4 where R' is 3,3,3-trifluoropropyl.

6. The composition of claim 4 where R' is phenyl.

7. The process comprising reacting
(a) an organosilicon compound containing at least one $\equiv$SiH bond with
(b) an organic compound containing aliphatic unsaturation, in the presence of
(c) a catalytic amount of the reaction product of
(1) chloroplatinic acid, and
(2) at least one organosilicon compound of the formula

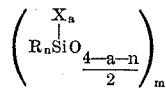

where
R is selected from the group consisting of monovalent hydrocarbon and monovalent halohydrocarbon radicals at least one of said R groups containing terminal aliphatic unsaturation,
X is a hydrolyzable group,
$n$ has an average value of 1.5 to 3,
$m$ has an average value of 1 to 20, and
$a$ has an average value of 0 to 2.5.

References Cited

UNITED STATES PATENTS 3,159,601   12/1964   Ashby _____ 260—448.2

FOREIGN PATENTS 804,097   11/1958   Great Britain.
1,069,148   11/1959   Germany.

PATRICK P. GARVIN, *Primary Examiner.*

U.S. Cl. X.R.

252—429, 431